(12) United States Patent
Meyer et al.

(10) Patent No.: US 11,358,596 B2
(45) Date of Patent: Jun. 14, 2022

(54) METHODS AND SYSTEM FOR CREEP TORQUE AND TIP IN CONTROL FOR VEHICLES WITH AUTOMATIC TRANSMISSIONS

(71) Applicant: Ford Global Technologies, LLC, Dearborn, MI (US)

(72) Inventors: Jason Meyer, Canton, MI (US); Yanan Zhao, Ann Arbor, MI (US); Rajit Johri, Canton, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 230 days.

(21) Appl. No.: 16/570,816

(22) Filed: Sep. 13, 2019

(65) Prior Publication Data
US 2021/0078578 A1 Mar. 18, 2021

(51) Int. Cl.
*B60W 30/18* (2012.01)
*B60W 20/15* (2016.01)
*B60W 30/192* (2012.01)

(52) U.S. Cl.
CPC ...... *B60W 30/18063* (2013.01); *B60W 20/15* (2016.01); *B60W 30/192* (2013.01); *B60W 2510/0642* (2013.01)

(58) Field of Classification Search
CPC ......... B60W 30/18063; B60W 30/192; B60W 20/15; B60W 2510/0642; B60W 2050/0041; B60W 10/06; B60W 10/08; B60W 10/02; B60W 10/026; B60W 2510/244; B60W 2510/305; B60W 2540/10; B60W 20/13; B60W 20/40; B60W 20/10; B60W 2710/0666; B60W 2710/083; Y02T 10/40; Y02T 10/62; B60K 6/448; B60K 6/52; B60K 6/387; B60K 6/442; B60K 2006/4825; B60K 2006/4808; B60K 6/48; B60K 6/547
See application file for complete search history.

(56) References Cited

U.S. PATENT DOCUMENTS

| 7,909,730 | B2 | 3/2011 | Schwarz et al. | |
|---|---|---|---|---|
| 8,905,897 | B2 | 12/2014 | Oh et al. | |
| 2003/0034188 | A1* | 2/2003 | Gotou | B60W 10/08 180/65.225 |
| 2010/0000807 | A1* | 1/2010 | Rodriguez | B60K 6/48 180/65.25 |

(Continued)

*Primary Examiner* — Brian P Sweeney
(74) *Attorney, Agent, or Firm* — David Kelley; McCoy Russell LLP

(57) ABSTRACT

Methods and systems are provided for controlling a distribution between engine and motor torques for a hybrid electric vehicle operating in a creep mode of operation in response to an engine start request. In one example, responsive to a request to start an engine while a vehicle is being propelled at a predetermined wheel creep torque via an electric motor positioned downstream of a transmission and a torque converter, coordinating an electric motor torque and an engine torque in one of a first mode, second mode, or a third mode depending on whether the electric motor can continue to provide the predetermined wheel creep torque. In this way, engine idle speed may be minimized depending on vehicle operating conditions, which may improve fuel economy.

9 Claims, 7 Drawing Sheets

(56) References Cited

U.S. PATENT DOCUMENTS

2015/0111693 A1* 4/2015 Wang .................... B60W 20/50
477/5
2018/0162367 A1 6/2018 Oh et al.

* cited by examiner

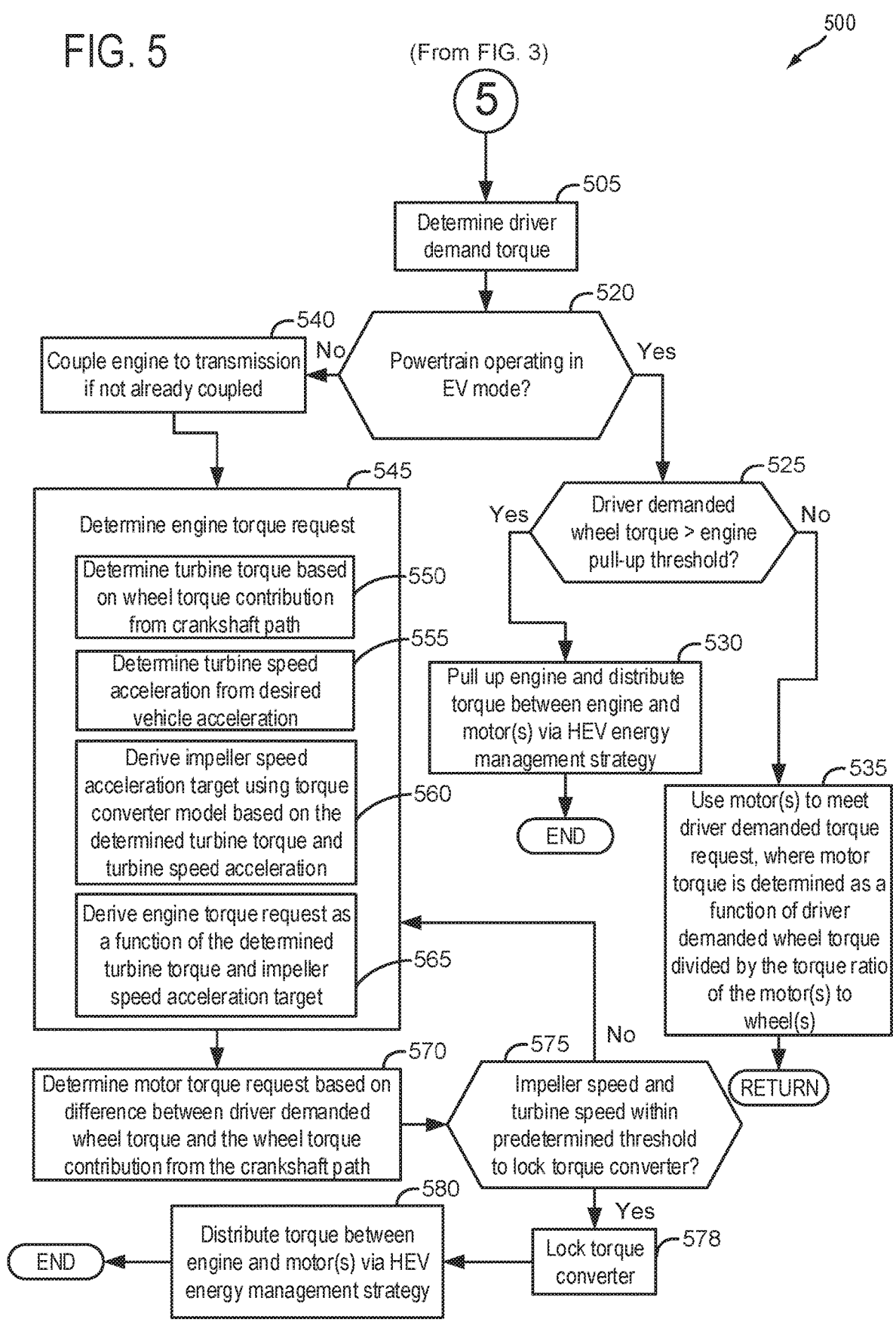

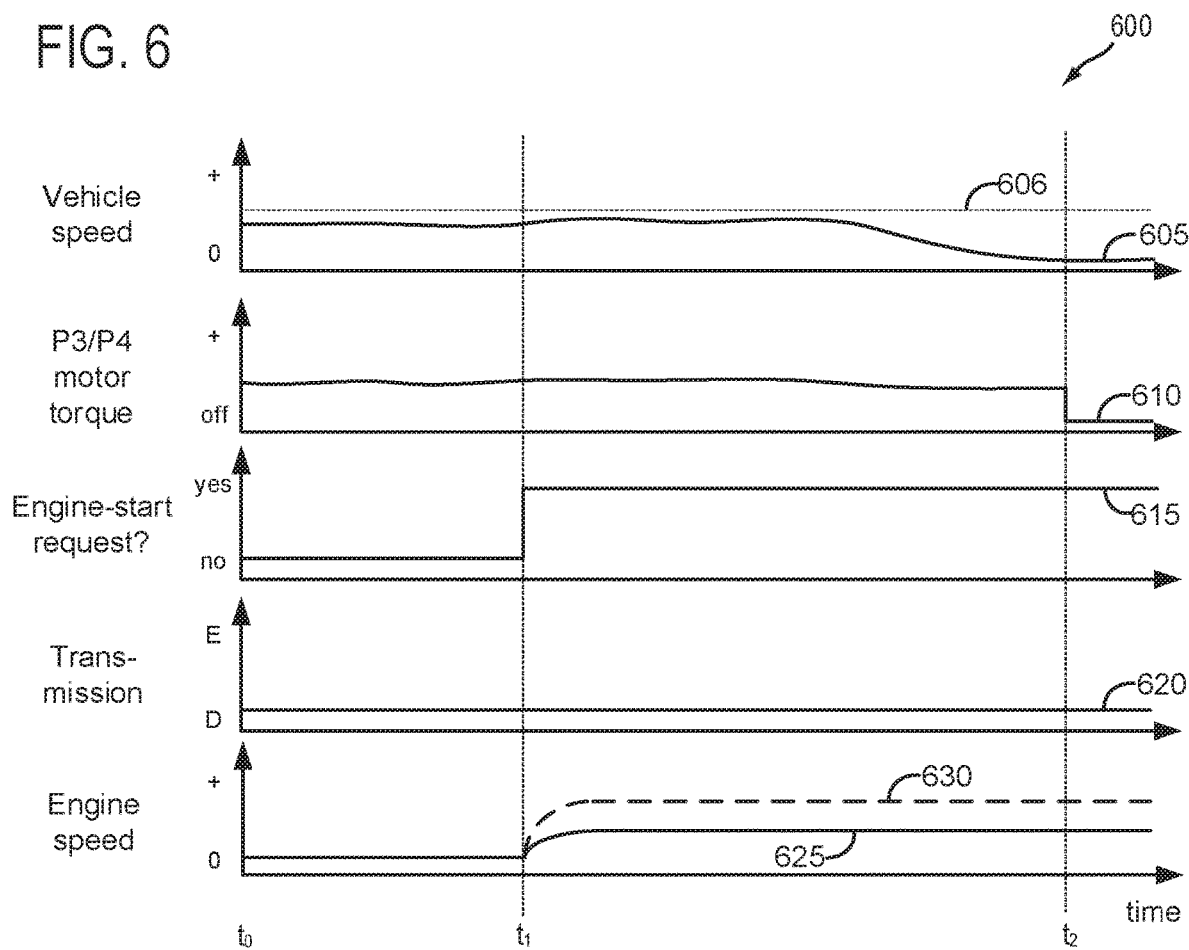

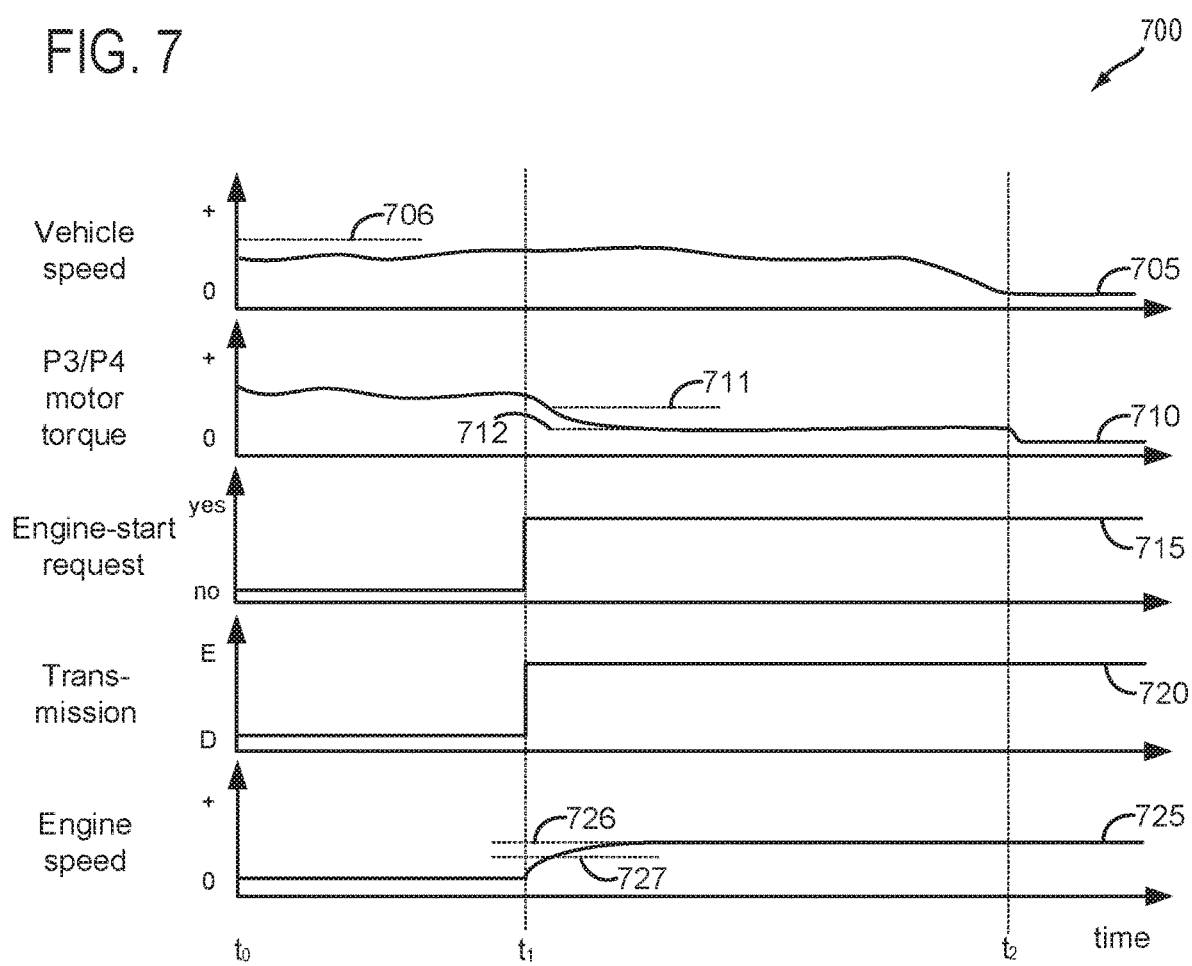

METHODS AND SYSTEM FOR CREEP TORQUE AND TIP IN CONTROL FOR VEHICLES WITH AUTOMATIC TRANSMISSIONS

FIELD

The present description relates generally to methods and systems for managing creep behavior in a hybrid electric vehicle that includes electric motor(s) downstream of a transmission and torque converter.

BACKGROUND/SUMMARY

Vehicles with automatic transmissions provide a small amount of positive propulsion at low vehicle speeds under conditions where the accelerator pedal is not applied. This behavior is referred to as "creep", and may be automatically achieved in vehicles with a torque converter based on the operating characteristics of the torque converter. For example, when a vehicle with a torque converter is stationary with the engine combusting and connected to the driveline, the torque converter may transmit enough torque to result in vehicle motion unless such motion is resisted by wheel brakes. As the brakes are released and vehicle motion begins, torque transmitted through the torque converter quickly increases until the vehicle reaches an equilibrium point where the road load is balanced by the torque converter's output.

Hybrid electric vehicles (HEVs) utilize a combination of an internal combustion engine and an electric motor or motors to provide power requested for propelling a vehicle. Inclusion of the electric motor(s) may provide for an improved fuel economy as compared to a vehicle that operates solely via an internal combustion engine. For example, the engine may be shut down at times where engine operation is inferred to be inefficient and/or is not otherwise requested to propel the vehicle. With the engine shut down, certain vehicle operating conditions including but not limited to driver demand greater than what can be provided via the motor(s), battery SOC below a threshold, electric motor degradation, request for accessory power, etc., may result in a request for an engine pull up. In response to a request for engine pull up, it is desirable to start the engine smoothly and quickly in a manner that avoids disturbing the vehicle operator or passengers.

In some examples, a hybrid electric vehicle may manage creep behavior without the use of a torque converter. In one example, the one or more motor(s) may be used to provide creep behavior. In another example (e.g. dual clutch transmission), engine operation in conjunction with clutch control (e.g. slipping clutch) may be used to provide creep behavior. However, there are other examples where a hybrid electric vehicle may also include a torque converter. In such an example, creep behavior may be provided via one or more electric motor(s) while the engine is off. Providing creep behavior via the motor(s) may improve efficiency and wheel torque accuracy in some examples as compared to relying on producing wheel torque via the fluid path of the torque converter. Yet although providing creep behavior via the motor(s) may improve efficiency and wheel torque accuracy, there may be instances where an engine pull up may be requested (e.g. vehicle operator demand for air conditioning or heat, state of charge of a battery below a threshold, battery fault, motor fault, inverter fault, etc.) while the motor(s) are providing creep behavior. In response to an engine pull up under such conditions, it may be desirable to command the engine idle speed as low as possible for fuel economy improvements, however this may in some examples result in a lower than driver-expected creep torque.

The inventors have herein recognized the above-mentioned issues, and have herein developed systems and methods to at least partially address them. In one example, a method comprises in response to a request to start an engine of a vehicle while the vehicle is being propelled at a predetermined wheel creep torque via an electric motor positioned downstream of a transmission and a torque converter, coordinating an electric motor torque and an engine torque in a first mode, a second mode or a third mode based on whether the electric motor can continue to provide the predetermined wheel creep torque. In this way, a speed at which the engine is controlled to in response to the engine start request may be minimized based on operating conditions which may improve fuel economy.

As an example, the request to start the engine may pertain to usage of the engine for purposes other than propelling the vehicle. The electric motor positioned downstream of the transmission may include an electric machine integrated into a rear differential unit of the vehicle, or may include one or more electric motor(s) that drive a front axle of the vehicle.

As another example, the first mode may include an indication that the electric motor can continue to provide an entirety of the predetermined wheel creep torque without assistance from the engine. In such an example, the method may include decoupling the engine from the transmission and controlling a speed of the engine to a second engine idle speed that is lower than a first engine idle speed. The first engine idle speed may correspond to a desired engine idle speed for propelling the vehicle at the predetermined wheel creep torque in absence of any contribution from the electric motor.

In another example, the second mode may include an indication that the request to start the engine is due to the electric motor not being able to continue providing any torque to propel the vehicle. In such an example, the method may include mechanically coupling the engine to the transmission and controlling the speed of the engine to the first engine idle speed.

As yet another example, the third mode may include an indication that the electric motor can continue to provide at least a portion of the predetermined wheel creep torque. In such an example, the method may include mechanically coupling the engine to the transmission, determining a maximum wheel torque that can be contributed via the electric motor, determining a corresponding wheel torque contribution from an impeller of the torque converter based on a difference between the predetermined wheel creep torque and the maximum wheel torque, obtaining a first impeller speed based on the corresponding wheel torque contribution from the impeller, obtaining a second impeller speed that corresponds to a minimum impeller speed, and controlling the engine to a third engine idle speed that is a maximum between the first impeller speed and the second impeller speed. In such an example, the method may further include commanding an engine wheel creep torque as a function of the third engine idle speed, and commanding an electric motor wheel creep torque as a function of a difference between the predetermined wheel creep torque and the engine wheel creep torque. Furthermore, the minimum impeller speed may be a function of operating conditions of the engine as well as transmission protection limits. In some examples, the method may include discontinuing the electric motor wheel creep torque in response to an indication that the vehicle is stationary.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 depicts an example method for distributing torque between an engine and electric motor(s) responsive to a driver tip-in from creep mode;

FIG. 6 depicts a prophetic example for controlling vehicle creep in response to an engine pull-up event where electric motor(s) can continue to provide all of the torque requested for propelling the vehicle;

FIG. 7 depicts a prophetic example for controlling vehicle creep in response to an engine pull-up event where electric motor(s) can provide just a fraction of the torque demanded for propelling the vehicle.

DETAILED DESCRIPTION

Figure 2:
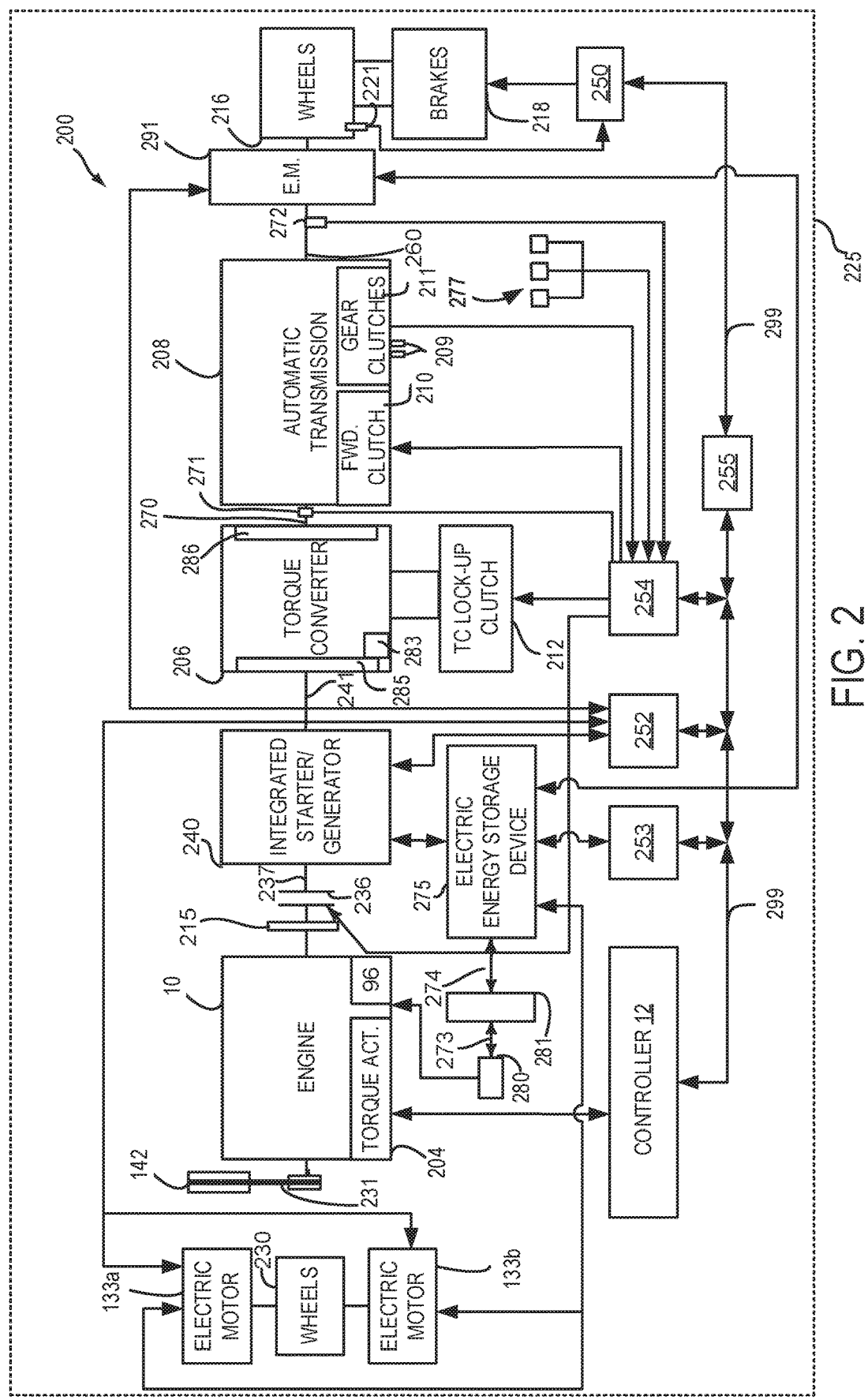
FIG. 2 is a schematic diagram of a hybrid vehicle driveline.
Figure 3:
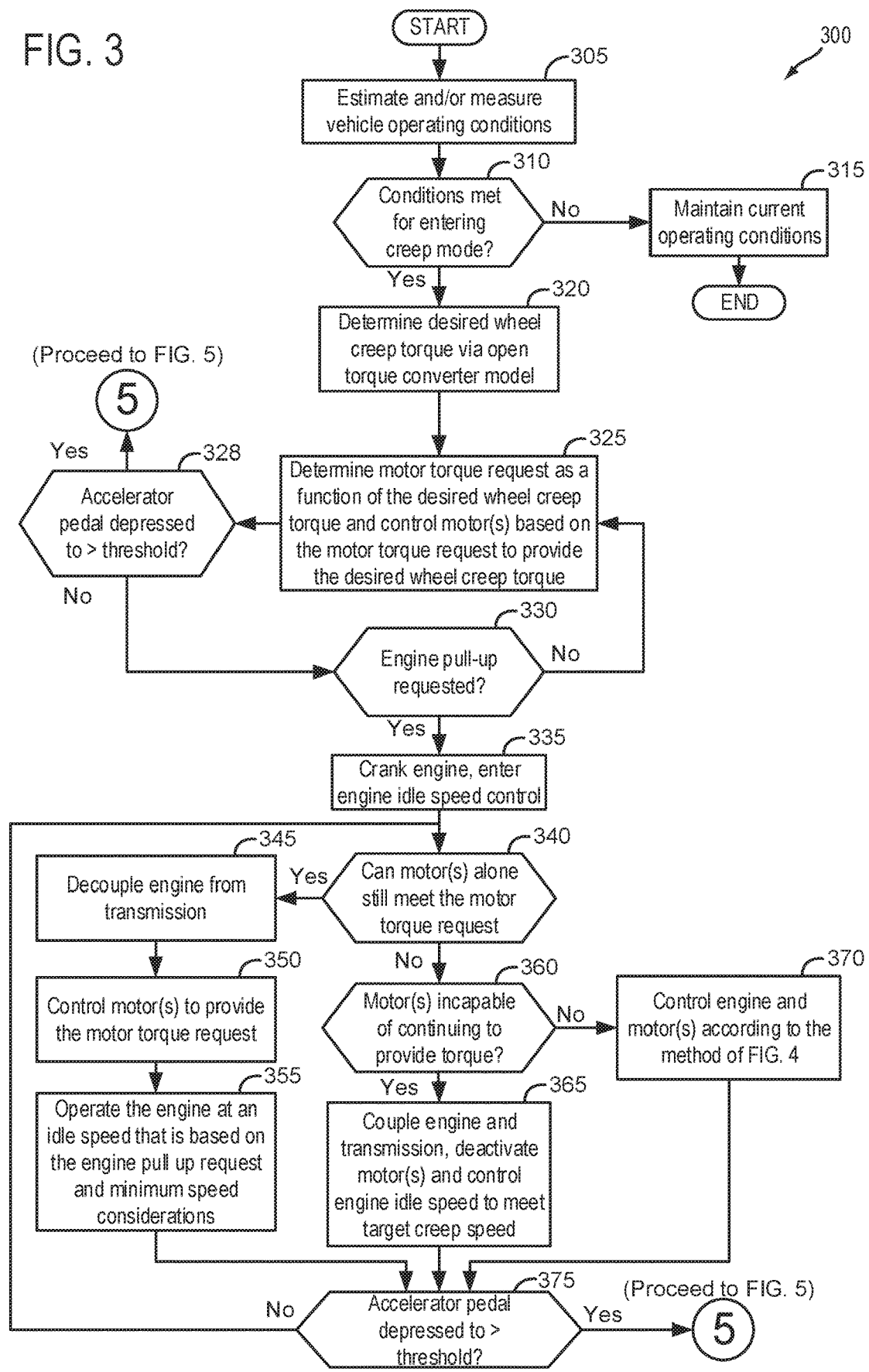
FIG. 3 depicts an example method for creep mode selection and control of actuator torque and/or speed.

The following description relates to systems and methods for coordinating engine and motor torque in a hybrid electric vehicle in response to an engine start request while the vehicle is being propelled solely via electric motor(s) in a creep mode of operation, where the engine start request is due to a reason that does not include an increased wheel torque. The vehicle may include a torque converter positioned between the engine and the transmission. An example illustration of an engine is thus depicted at FIG. 1, and an example illustration of a driveline of the hybrid vehicle including the engine of FIG. 1, a torque converter, a transmission and electric motor(s) is depicted at FIG. 2. As shown at FIG. 2, the electric motor(s) may be one of an electric machine integrated into a rear differential unit of the vehicle, or electric motor(s) for driving a front axle of the vehicle. FIG. 3 depicts an example methodology for operating the vehicle in one of four different creep modes, where the different modes are dependent at least in part on an ability of the electric motor(s) to provide desired wheel creep torque. In one example where an engine start is requested and where the electric motor(s) cannot continue to provide an entirety of the desired wheel creep torque but instead just a portion of the desired wheel creep torque, torque distribution between the engine and the electric motor(s) may be controlled as per the method of FIG. 4. In some examples, a tip-in event or request for vehicle acceleration may occur while the vehicle is operating in one of the four above-mentioned creep modes. In such an example, the acceleration request may be met via the electric motor(s) and the engine may be used to prepare for impeller speed inertia compensation (to balance engine speed and torque converter operation) and road load before impeller speed and turbine speed are close enough to lock the torque converter, as illustrated via the methodology of FIG. 5. FIG. 6 depicts a prophetic example for how to control vehicle creep in response to an engine pull-up event where the electric motor(s) can continue to provide all of the torque demanded for propelling the vehicle. Alternatively, FIG. 7 depicts another prophetic example for controlling vehicle creep in response to an engine pull-up event where electric motor(s) can provide just a fraction of the torque demanded for propelling the vehicle.

Figure 1:
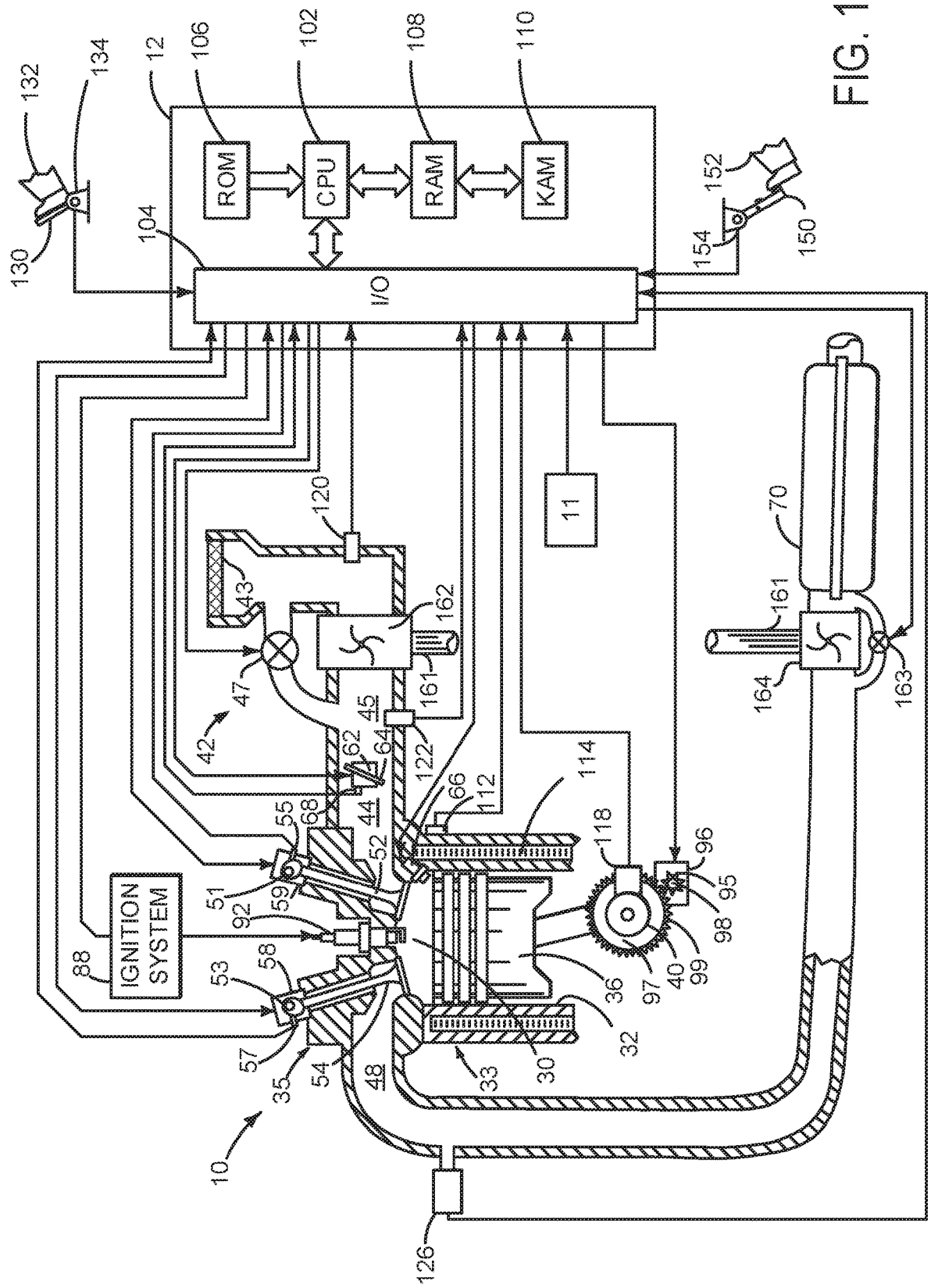
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1-2 and employs the actuators shown in FIGS. 1-2 to adjust engine operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed decreasing, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, electric machine 240 may be omitted. Engine 10 may be started with an engine starting system shown in FIG. 1, via BISG 142, or via driveline integrated starter/generator (ISG) 240 also known as an integrated starter/generator or referred to herein as an electric machine. Driveline ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

BISG 142 is mechanically coupled to engine 10 via belt 231. BISG may be coupled to crankshaft 40 or a camshaft (e.g., 51 or 53 of FIG. 1). BISG may operate as a motor when supplied with electrical power via electric energy storage device 275 or low voltage battery 280. BISG may operate as a generator supplying electrical power to electric energy storage device 275 or low voltage battery 280. Bi-directional DC/DC converter 281 may transfer electrical energy from a high voltage buss 274 to a low voltage bus 273 or vise-versa. Low voltage battery 280 is electrically coupled to low voltage buss 273. Electric energy storage device 275 is electrically coupled to high voltage buss 274. Low voltage battery 280 selectively supplies electrical energy to starter motor 96.

An engine output torque may be transmitted to an input or first side of powertrain disconnect clutch 236 through dual mass flywheel 215. Disconnect clutch 236 may be electrically or hydraulically actuated. The downstream or second side of disconnect clutch 236 is mechanically coupled to ISG input shaft 237. While disconnect clutch 236 is depicted, there may be other examples within the scope of the present disclosure where disconnect clutch 236 may be omitted.

ISG 240 may be operated to provide torque to powertrain 200 or to convert powertrain torque into electrical energy to be stored in electric energy storage device 275 in a regeneration mode. ISG 240 is in electrical communication with energy storage device 275. ISG 240 may have a higher output torque capacity than starter 96 shown in FIG. 1 or BISG 142. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252. While ISG 240 is depicted at FIG. 2, in some examples ISG 240 may be omitted without departing from the scope of this disclosure.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by transmission controller 254. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 206 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which may rotate at a same speed as ISG 240 (where included).

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

An electric machine 291 may be included downstream of transmission 208. Electric machine 291 may be a high voltage (e.g. operated with greater than 30 volts) machine, and may also be referred to as an electric motor and/or generator. Electric machine 291 may receive electrical energy from electric energy storage device 275. Electric machine 291 may be integrated into a rear differential unit (RDU, not shown), in some examples. Where included, the rear drive unit may include a gear set and one or more clutches to decouple transmission 208 and electric machine 291 from wheels 216. Discussed herein, electric machine 291 may be referred to as a P3 motor or P3 electric machine.

A front axle (not shown) may be driven electrically via one or more of a first electric motor 133a and a second electric motor 133b. The front axle may be mechanically coupled to front wheels 230. First electric motor 133a and second electric motor 133b may receive electricity for operating via the electric energy storage device 275. Discussed herein first electric motor 133a and second electric motor 133b may be referred to as P4 motor(s). While not explicitly illustrated, it may be understood that while first electric motor 133a and second electric motor 133b may drive the front wheels 230, in other examples the first and the second electric motors may drive rear wheels via a rear axle (not shown), without departing from the scope of this disclosure.

A frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller 255 may obtain a driver demand torque or power request from an accelerator pedal or other device. Vehicle system controller 255 may then allocate a fraction of the requested driver demand torque to the engine and the remaining fraction to the ISG 240, BISG 142, electric machine 291, electric motor 133*a* and/or electric motor 133*b*. Vehicle system controller 255 requests the engine torque from engine controller 12 and the motor torque from electric machine controller 252. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque (e.g., desired powertrain wheel torque) to the ISG 240 or other electric machine/motor and the remaining fraction to friction brakes 218 (e.g., desired friction brake wheel torque). Further, vehicle system controller may notify transmission controller 254 that the vehicle is in regenerative braking mode so that transmission controller 254 shifts gears based on a unique shifting schedule to increase regeneration efficiency. In one example, ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. In other examples, other electric machines may additionally or alternatively provide negative torque for regenerative braking purposes. Any portion of desired negative wheel torque that may not be provided by ISG 240, for example, because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 (and/or other electric motors such as electric machine 291 and electric motors 133*a* and 133*b*) by adjusting current flowing to and from field and/or armature windings of the ISG (for example) as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive additional transmission information from sensors 277, which may include but are not limited to pump output line pressure sensors, transmission hydraulic pressure sensors (e.g., gear clutch fluid pressure sensors), ISG temperature sensors, electric machine (e.g. electric machine 291) temperature sensors, electric motor (e.g. electric motors 133*a* and 133*b*) temperature sensors, BISG temperature sensors, and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. As one example, brake controller 250 may also provide anti-lock and vehicle stability braking to improve vehicle braking and stability. As such, brake controller 250 may provide a wheel torque limit (e.g., a threshold negative wheel torque not to be exceeded) to the vehicle system controller 255 so that negative ISG torque, for example, does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Thus, discussed herein, a system for a hybrid vehicle may include an engine, a torque converter and a transmission. The system may further include an electric motor positioned downstream of the transmission. The system may further include a controller with computer readable instructions stored on non-transitory memory that when executed, cause the controller to: control the electric motor to produce an electric motor torque corresponding to a desired wheel creep torque, and in response to a request to start the engine, mechanically couple the engine and the transmission and coordinate the electric motor torque and an engine torque to propel the vehicle based on the desired wheel creep torque.

For such a system, the controller may store further instructions to determine an engine idle speed as a function of a maximum value between a first impeller speed and a second impeller speed, where the first impeller speed is obtained based on a wheel torque contribution from an impeller of the torque converter, and where the second impeller speed is a function of one or more of engine operating conditions and transmission protection limits, and control the engine to the engine idle speed.

For such a system, the controller may store further instructions to determine the wheel torque contribution from the impeller as a difference between the desired wheel creep torque and a maximum wheel torque that can be contributed via the electric motor.

For such a system, the controller may store further instructions to determine the engine torque from the engine idle speed, and command the engine to produce the engine torque.

For such a system, the controller may store further instructions to determine the electric motor torque based on a difference between the engine torque and the desired wheel creep torque.

For such a system, the controller may store further instructions to provide an indication that the electric motor can continue to provide some, but not all, of the electric motor torque corresponding to the desired wheel creep torque responsive to the request to start the engine.

Turning now to FIG. 3, depicted is an example method 300 for selecting a manner in which to manage creep mode in a hybrid electric vehicle. Specifically, method 300 depicts how to manage control of an engine and/or one or more electric motors for managing vehicle creep under predetermined operating conditions.

Method 300 will be described with reference to the systems and components described herein and shown in FIGS. 1-2, though it will be appreciated that similar methods may be applied to other systems and components without departing from the scope of this disclosure. Instructions for carrying out method 300 and the rest of the methods included herein may be executed by a controller, such as controller 255 at FIG. 2, based on instructions stored in non-transitory memory, and in conjunction with signals received from sensors of the engine system and vehicle powertrain as discussed with regard to FIGS. 1-2. The controller may employ actuators such as engine torque actuators (e.g. torque actuators 204 at FIG. 2), electric machine (e.g. electric machine 291 at FIG. 2), electric motor(s) (e.g. electric motors 133a and 133b at FIG. 2), etc., to alter a state of devices in the physical world according to the methods depicted below.

Method 300 begins at 305 and includes estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, BISG torque, ISG torque, electric machine torque, battery SOC, etc., various fuel system conditions, such as fuel level, fuel type, fuel temperature, etc., as well as various ambient conditions, such as ambient temperature, humidity, barometric pressure, etc.

Proceeding to 310, method 300 includes indicating whether conditions are met for entering into creep mode. Creep mode may be understood to refer to a mode of vehicle operation in which the vehicle is propelled forward at a predetermined speed and/or a speed that is dependent on engine idle speed, in absence of accelerator pedal depression. Specifically, wheel brakes, when applied, may prevent the vehicle from moving in creep mode, but release of the brake pedal (e.g. braking force less than 50% of total braking force) may allow the vehicle to automatically move forward without driver input via the accelerator pedal (e.g. accelerator pedal not depressed). The vehicle may thus be stationary or moving when conditions are indicated to be met for entering into creep mode. As one example, conditions may thus be met for entering creep mode when vehicle speed is less than a threshold vehicle speed (e.g. less than 5 miles per hour (MPH) and where the accelerator pedal is not depressed.

In some examples, a maximum vehicle speed imposed by the vehicle system controller (e.g. vehicle system controller 255 at FIG. 2) under a creep condition may be 5 MPH, and a corresponding maximum output creep torque may be 150 N-m, although such values may be greater or lesser without departing from the scope of this disclosure.

If, at 310, conditions are not indicated to be met for entering into creep mode, then method 300 may proceed to 315. At 315, method 300 includes maintaining current vehicle operating conditions. For example, if the vehicle is traveling at a speed greater than the threshold vehicle speed for entering into creep mode, then such conditions may be maintained. In other examples current operating conditions may be maintained the vehicle is stationary with the brake pedal depressed by greater than a threshold amount (e.g. depressed to 95% or 100% depressed). Method 300 may then end. While method 300 is depicted as ending, it may be understood that in other examples method 300 may return to the start from step 315. In other words, during vehicle operation method 300 may continuously or regularly query as to whether conditions are met for entering into creep mode.

If, at 310, conditions are indicated to be met for entering into creep mode, method 300 may proceed to 320. At 320, method 300 may include determining a desired wheel creep torque. Determining the desired wheel creep torque may be via an open torque converter physics model, or in other words, a model of a torque converter in an open or unlocked state. Specifically, the desired wheel creep torque (Tq_whlCreep) may be determined via the open torque converter physics model as a function of desired engine idle speed for creep (Nidle_desCreep), and turbine speed (e.g. turbine 286 at FIG. 2) at creep (Nt_creep), under an assumption that the impeller (e.g. impeller 285 at FIG. 2) runs at the desired engine idle speed for creep and where turbine speed is derived with equilibrium vehicle speed where nominal road load is balanced by the torque converter's output. Specifically, desired wheel creep torque is defined by the following equation:

$$Tq\_whlCreep = f(Nidle\_desCreep, Nt\_creep); \qquad (1)$$

where impeller speed runs at the desired engine idle speed for creep and where the turbine speed at creep is derived from equilibrium vehicle speed. It may be understood that equilibrium speed is a speed at which the road load is balanced by the torque converter's output. It may be further understood that determining the desired wheel creep torque via the open torque converter model may be carried out by the controller (e.g. VSC 255 at FIG. 2) based on instructions stored therein for determining the desired wheel creep torque.

With the desired wheel creep torque determined at 320, method 300 proceeds to 325. At 325, method 300 includes determining a motor torque request (Tq_mtr_Req) for providing the desired wheel creep torque. It may be understood that it may be desirable from an energy efficiency and torque accuracy standpoint to provide the desired wheel creep torque via the electric machine (e.g. electric machine 291 at FIG. 2) and/or via the electric motor(s) (e.g. electric motors 133a and 133b), with the engine off and not engaged with the transmission. Thus, discussed herein, a creep mode in which one or more of the electric motor(s) and/or electric machine are used to provide the desired wheel torque and where the engine is off and is disengaged with the transmission may be referred to as a first mode, or alternatively as an electric vehicle (EV) mode.

Accordingly, determining the motor torque request (Tq_mtr_Req) at 325 may include dividing the desired wheel creep torque (Tq_whlCreep) by a torque ratio (rt_mtr2whl) from one or more of the electric machine (e.g. electric machine 291 at FIG. 2) and/or electric motor(s) (e.g. electric motors 133a and 133b at FIG. 2), depending on which is selected to provide the motor torque request. In some examples, selecting the motor to use for providing the desired wheel creep torque may be based on an indication of an absence of degradation of the motor or any other components (e.g. inverter) that may prevent a particular motor from functioning as desired. It may be understood that, at 325, the motor torque request may not be provided via an electric motor upstream of the transmission. In other words, the motor torque request may not be provided via the ISG (e.g. ISG 240 at FIG. 2) or BISG (e.g. BISG 142 at FIG. 2), but instead may be provided via the electric machine downstream of the transmission (e.g. electric machine 291 at FIG. 2) and/or the electric motor(s) coupled to the front axle (e.g. electric motors 133a and 133b at FIG. 2). Thus, at 325 method 300 include determining the motor torque request via the following equation:

$$Tq\_mtr\_Req = Tq\_whlCreep/rt\_mtr2whl; \quad (2)$$

where rt_mtr2whl is the torque ratio from the particular electric machine/motor to associated wheel.

With the motor torque request determined at 325, method 300 includes controlling the motor(s) based on the motor torque request in order to provide the desired wheel creep torque. Specifically, the appropriate controller (e.g. electric machine controller 252 at FIG. 2) may command the selected electric machine and/or front axle motor(s) to provide the motor torque request determined at 325. As discussed above, propelling the vehicle solely via the electric machine integrated into the rear differential and/or front axle electric motor(s) may be understood to be a mode of operation referred to as EV mode.

While in EV mode, method 300 proceeds to 328. At 328, method 300 includes indicating whether a tip-in event is occurring. A tip-in event may include an increased driver demand corresponding to an accelerator pedal being depressed to a position greater than a threshold position. In one example, the threshold position may be 5% depressed (where 100% depressed corresponds to a fully depressed accelerator pedal). In another example the threshold position may be greater than, or less than 5% depressed. If a tip-in event is indicated, then method 300 may proceed to FIG. 5, where method 500 may be carried out. It may be understood that in some examples a tip-in event may involve an engine pull up request if driver demand is significant enough, whereas in other examples a tip-in event may not result in an engine pull up.

If a tip-in event is not indicated at 328, then method 300 may proceed to 330. At 330, method 300 includes indicating whether an engine pull up is requested that is not due to a tip-in event. In other words, at 330 method 300 includes indicating whether conditions are met for starting the engine for reasons that do not include increased driver demanded wheel torque as a function of accelerator pedal position. Said another way, it may be understood that the query at step 330 does not pertain to an engine pull up due to an increased driver demanded wheel torque (referred to herein as a tip-in event from creep mode), but rather other operating conditions that necessitate engine operation. Specifically, an engine pull up request at 330 may pertain to a situation where a driver or passenger of the vehicle requests cabin heat or air conditioning or use of some other accessory with an energy demand that necessitates engine operation. As another example, the engine pull up request may pertain to a situation where the battery (e.g. electric energy storage device 275 at FIG. 2) has a state of charge (SOC) below an SOC threshold. As another example, the engine pull up request may relate to a situation where a fault is associated with the particular motor or motors supplying the motor torque request. In other words, an engine pull up may be requested in response to a fault that degrades operation of the motor or motors supplying the motor torque request.

If, at 330, an engine pull up is not requested, then method 300 continues to provide the creep torque via the electric machine coupled to the rear differential and/or the electric motor(s) coupled to the front axle.

Alternatively, in response to an engine pull up being requested at 330, method 300 proceeds to 335. At 335, method 300 includes cranking the engine and providing fueling and spark to the engine so the engine begins combusting air and fuel.

Continuing to 340, method 300 includes determining whether the selected electric machine/motors can still meet the motor torque request. In other words, if battery SOC has not decreased to below the threshold SOC and/or if a motor fault (or some other fault like an inverter fault) has not been indicated, then the electric machine/motors may still be capable of fully meeting the motor torque request. In such an example, method 300 may proceed to 345. Discussed herein, when engine operation is requested and where the electric machine/motors can still fully provide the motor torque request, powertrain operation is referred to as a second mode of operation, which will be further detailed below.

At 345, method 300 may include decoupling or disengaging the engine from the transmission. As one example where the powertrain includes a driveline disconnect clutch (e.g. driveline disconnect clutch 236 at FIG. 2), the driveline disconnect clutch may be commanded open or maintained open in order to decouple the engine from the transmission. Additionally or alternatively, in some examples a clutch or a set of clutches (e.g. forward clutch 210 and/or gear clutches 211 at FIG. 2) may be commanded open or depressurized to disengage the transmission from engine operation. In one example where the transmission includes a dual clutch transmission (DCT) (e.g. a transmission that uses a first clutch and a second clutch for odd and even gear sets, respectively), both the first clutch and the second clutch may be commanded fully open to decouple the transmission from the engine.

With the engine decoupled from the transmission, method 300 may proceed to 350. At 350, method 300 includes continuing to control the selected electric machine/motor(s) to meet the motor torque request as defined by equation (2) above.

Proceeding to 355, method 300 includes operating the engine at an idle speed that is based on the reason for the engine pull up request and minimum engine speed considerations. Specifically, as discussed above, when engine operation is requested while the vehicle is being propelled in creep mode, it is desirable for engine idle speed to be as low as possible for fuel economy considerations. Because the second mode of operation as discussed herein includes the engine being disconnected from the transmission, engine idle speed may be lower than engine idle speed for creep mode (e.g. Nidle_desCreep as discussed above) to a second engine idle speed (Nidle_desCreep2). Thus, it may be understood that the second engine idle speed (Nidle_desCreep2) is lower than the desired engine idle speed for creep (Nidle_desCreep), where the second engine idle speed is a function of the reason for the engine pull up request and minimum engine speed considerations. For example, the second engine idle speed may not be lower than a threshold speed (e.g. minimum speed) due to potential degradation of engine operating conditions. Furthermore, the particular speed at which the engine idle speed is controlled to may be a function of what accessory load operation was requested, at what level (e.g. a higher demand for cabin heat may require an increased engine speed as compared to a lesser demand, where higher demand may include a higher heat setting).

Accordingly, at 355, method 300 includes controlling the engine speed to the second engine idle speed (Nidle_desCreep2) via the controller commanding one or more engine torque actuators (e.g. engine torque actuators 204 at FIG. 2) to regulate the engine speed to the second engine idle speed. It may be understood that the second mode of operation as discussed above may provide an advantage in that creep torque may be accurately provided via the electric machine/motor(s) while avoiding inefficient torque transfer from the torque converter and/or transmission due to the engine being decoupled from the transmission.

Returning to 340, in another example where the electric machine/motor(s) are not capable of continuing to meet the motor torque request, then method 300 may proceed to 360. At 360, method 300 may include indicating whether the electric machine/motor(s) are incapable of continuing to provide any torque. It may be understood that in some examples, the engine pull up at step 330 may be due to the electric machine/motor(s) having a fault such that they are unable to continue producing torque. In another example the engine pull up at step 330 may be due to the battery SOC being below the threshold. For example, a depleted battery may be unable to continue providing electricity to power the particular electric machine/motor(s).

In other examples, the electric machine/motor(s) may be able to continue providing some level of motor torque to meet the motor torque request. For example, battery SOC may not be below the threshold, also referred to as a first SOC threshold, but may be below a second SOC threshold that is greater than the first SOC threshold. In such an example, the electric machine/motor(s) may be capable of providing some of the motor torque request but not an entirety of the motor torque request.

In a situation where the electric machine/motor(s) are not capable of providing any of the motor torque request, method 300 proceeds to 365. At 365, method 300 includes coupling the engine to the transmission, deactivating the electric machine/motor(s) that were in use to provide the vehicle creep, and controlling engine idle speed at the desired engine idle speed for creep (Nidle_desCreep). Powertrain operation where the engine is coupled to the transmission, where the electric machine/motor(s) are deactivated, and where the engine is controlled to the desired engine idle speed for creep (Nidle_desCreep) may be referred to as a third mode of operation. It may be understood that for the third mode of operation, the desired engine idle speed is greater than the second engine idle speed (Nidle_desCreep2) discussed above.

Returning to 360, in a case where the electric machine/motor(s) can continue to provide at least some torque to meet the motor torque request, method 300 may proceed to 370. At 370, method 300 includes controlling the engine and electric machine/motor(s) according to the method depicted at FIG. 4. Discussed herein, a situation where an engine pull up is requested during creep mode where the electric machine/electric motor(s) were providing the motor torque request for creep and where the electric machine/motor(s) are still capable of providing at least some of the motor torque request may be referred to as a fourth mode of operation. While not explicitly shown, it may be understood that in response to an indication of a request to control the powertrain according to the fourth mode of operation, the transmission may be engaged. In other words, the engine may be mechanically coupled to the transmission in similar fashion as that discussed above for the third mode of operation.

Figure 4:
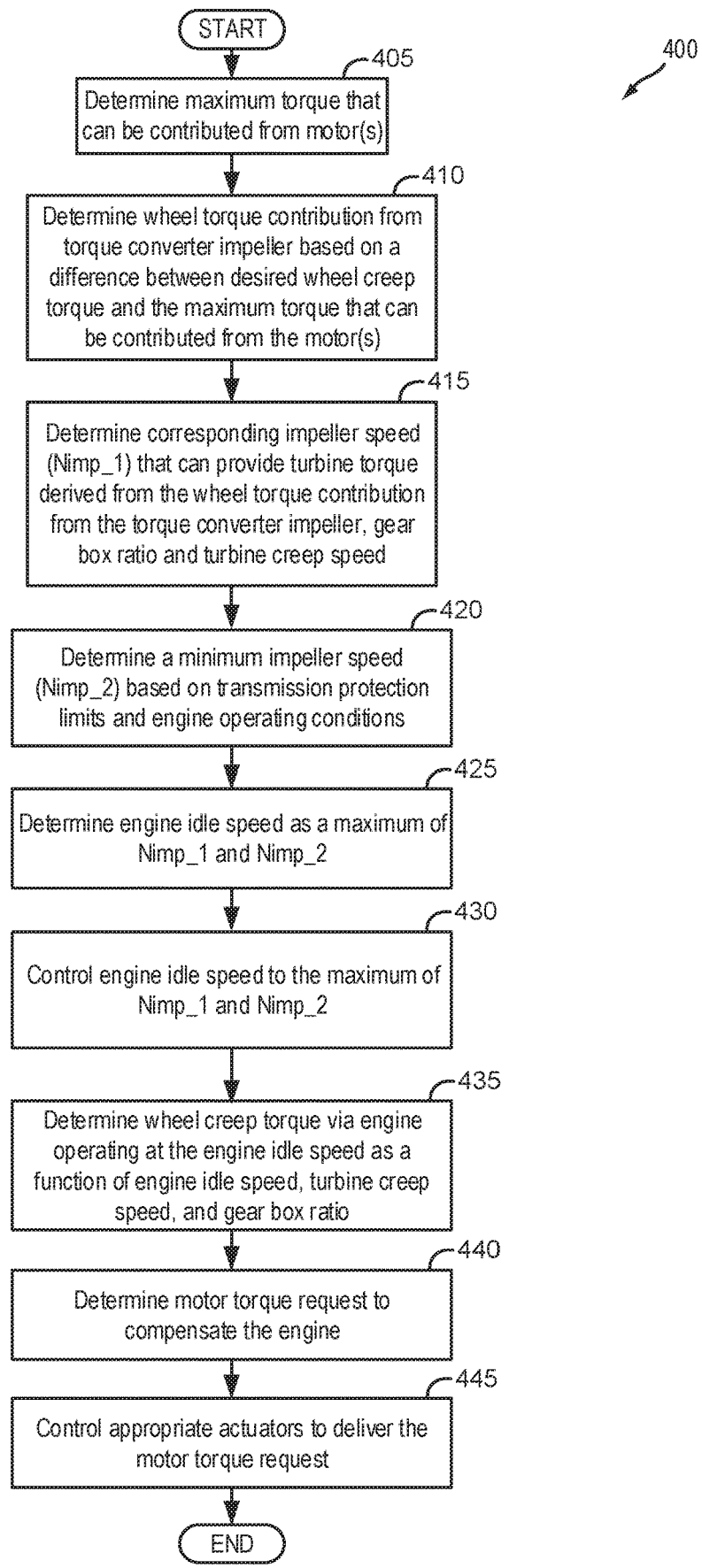
FIG. 4 depicts an example method for controlling creep of one of the creep modes of FIG. 3.

Accordingly, turning now to FIG. 4, depicted is an example method 400 for controlling the powertrain according to the fourth mode of operation. As method 400 proceeds from method 300, it may be understood that method 400 is described with reference to the systems and components described herein and shown in FIGS. 1-2, though it will be appreciated that similar methods may be applied to other systems and components without departing from the scope of this disclosure. Instructions for carrying out method 400 and the rest of the methods included herein may be executed by a controller, such as controller 255 at FIG. 2, based on instructions stored in non-transitory memory, and in conjunction with signals received from sensors of the engine system and vehicle powertrain as discussed with regard to FIGS. 1-2. The controller may employ actuators such as engine torque actuators (e.g. torque actuators 204 at FIG. 2), electric machine (e.g. electric machine 291 at FIG. 2), electric motor(s) (e.g. electric motors 133a and 133b at FIG. 2), etc., to alter state of devices in the physical world according to the method depicted below.

Method 400 begins at 405, and includes determining a maximum wheel torque that can be contributed from the particular electric machine/motor(s) (Tq_whlMtrMax) that were selected to provide the motor torque request as discussed above. Determining the maximum wheel torque may be based on one or more of battery SOC, temperature of the battery (e.g. electric energy storage device 275 at FIG. 2), temperature of the electric machine/motor(s), ambient temperature, etc. For example, the controller may request information pertaining to the above-mentioned variables and may process the requested information to ascertain the maximum wheel torque that can be contributed from the electric machine/motor(s).

Proceeding to 410, method 400 includes determining a wheel torque contribution from the impeller of the torque converter (Tq_whlImp). Specifically, the wheel torque contribution from the impeller may be determined as a difference between the desired wheel creep torque (Tq_whlCreep, see equation 1 above) and the maximum wheel torque that can be contributed from the particular electric machine/motor(s) (Tq_whlMtrMax), as per the following equation:

$$Tq\_whlImp = Tq\_whlCreep - Tq\_whlMtrMax \qquad (3)$$

With the wheel torque contribution needed from the impeller determined at step 410, method 400 proceeds to 415. At 415, method 400 includes determining a corresponding first impeller speed (Nimp_1). Specifically, the first impeller speed (N_imp1) may be an impeller speed that can provide a turbine torque which is derived from the wheel torque contribution from the impeller (Tq_whlImp), a transmission gearbox torque ratio (rt_gb) and turbine speed (Nt_creep, see equation 1 above).

With the first impeller speed (Nimp_1) determined at 415, method 400 proceeds to 420. At 420, method 400 includes determining a minimum impeller speed (Nimp_2), or second impeller speed, corresponding to transmission protection, engine operating conditions (e.g. many factors including but not limited to variation of engine coolant temperature, accessory loads, etc.), etc. For example, when impeller speed is low, a transmission main pump located at the transmission input shaft may no longer be able to sustain required transmission line pressure for hydraulic operation, and based on this consideration, minimum impeller speed may be determined for transmission protection. In other words, at 420, method 400 includes determining a minimum impeller speed that can be used given the current engine operational parameters and which is based on transmission protection considerations.

With the minimum impeller speed (Nimp_2) having been determined at 420, method 400 proceeds to 425. At 425, method 400 includes determining engine idle speed (Nidle_mode4) for operating the engine in the fourth mode as a maximum of the first impeller speed (Nimp_1) and the second impeller speed (Nimp_2). In other words, the engine idle speed for the fourth mode as defined by the method of FIG. 4 is selected as the maximum value between the first impeller speed and the second impeller speed.

With the engine idle speed for operating in the fourth mode having been determined at 425, method 400 proceeds to 430. At 430, method 400 includes controlling engine idle speed to the maximum value between the first engine idle speed and the second engine idle speed. Engine idle speed may be controlled to the determined engine idle speed (Nidle_mode4) via the engine torque actuator(s) (e.g. engine torque actuators 204 at FIG. 2), as discussed above.

Proceeding to 435, method 400 includes determining the wheel creep torque that can be supplied from the engine (Tq_whlCreepEng) operating at the engine idle speed for the fourth mode (Nidle_mode4). Specifically, the wheel creep torque that can be supplied from the engine operating in the fourth mode may be determined from the following equation:

$$Tq\_whlCreepEng=f(Nidle\_mode4, Nt\_creep)*rt\_gb; \quad (4)$$

where Nt_creep corresponds to the turbine speed derived with equilibrium vehicle speed where the nominal road load is balanced by the torque converter's output as described above with regard to equation (1), and where rt_gb is the torque ratio of the transmission gearbox.

With the wheel creep torque that can be supplied from the engine (Tq_whlCreepEng) having been determined at 435, method 400 proceeds to 440. At 440, method 400 includes determining an electric machine/motor request (Tq_mtrReqmode4) to compensate the engine in order to deliver the full creep wheel torque requested (Tq_whlCreep, see equation 1 above) when the powertrain is being operated via the fourth mode. Specifically, the motor torque request may be defined by the following equation:

$$Tq\_mtrReqmode4=(Tq\_whlCreep-Tq\_whlCreepEng)/rt\_mtr2whl; \quad (5)$$

where rt_mtr2whl is the torque ratio from the particular electric machine/motor to associated wheel as discussed above with regard to equation (2).

With the motor torque request determined at 440, method 400 may proceed to 445. At 445, method 400 includes controlling the electric machine/motor(s) to deliver the motor torque request. Again, it may be understood that the electric machine/motor(s) for delivering the motor torque request pertain to one or more of the electric machine associated with the rear wheels (e.g. electric machine 291 at FIG. 2) and/or the electric motor(s) associated with the front axle (e.g. electric motors 133a and 133b at FIG. 2). Specifically, the controller may control an amount of current directed to the appropriate electric machine/motor to control the motor torque to the motor torque request determined at 440.

As discussed above with regard to FIGS. 3-4, operating the powertrain in the second mode, third mode or the fourth mode may be in response to an engine pull up request that is not based on a driver demanded vehicle acceleration request, but rather is in response to a situation where the engine pull up is requested due to a request to power accessory load(s) (e.g. cabin heating), in response to an indication of battery SOC below the threshold SOC, an indication of a fault in the electric machine/motor that is functioning to provide vehicle creep, etc. Turning now to FIG. 5, an example method for controlling driver demanded torque distribution between an electric machine/motor(s) and the engine in response to a driver tip-in event from creep mode, is shown. Returning to FIG. 3, it may be seen that while the powertrain is being operated in one of the second mode, the third mode or the fourth mode, method 300 may proceed to FIG. 5 in response to a tip-in event at step 375. If a tip-in event is not indicated at 375, then method 300 continues to operate the powertrain according to either the second mode, the third mode or the fourth mode. Similarly, as discussed with regard to FIG. 3, a tip-in from the first mode (refer to step 328 at FIG. 3), or EV mode, may also result in the method of FIG. 3 proceeding to the method of FIG. 5.

FIG. 5 proceeds from FIG. 3, and is thus described with reference to the systems and components described herein and shown in FIGS. 1-2, although similar methods may be applied to other systems and components without departing from the scope of this disclosure. Instructions for carrying out method 500 and the rest of the methods included herein may be executed by a controller (e.g. VSC 255 at FIG. 2), based on instructions stored in non-transitory memory, and in conjunction with signals received from sensors of the engine system and vehicle powertrain as discussed with regard to FIGS. 1-2. The controller may employ actuators such as engine torque actuators (e.g. torque actuators 204 at FIG. 2), electric machine (e.g. electric machine 291 at FIG. 2), electric motor(s) (e.g. electric motors 133a and 133b at FIG. 2), etc., to alter state of devices in the physical world according to the methods depicted below.

Thus, FIG. 5 depicts an example method 500 for controlling engine and electric machine/motor torque distribution in response to a tip-in event from creep mode. As discussed herein, it may be understood that a tip-in event may correspond to an increased driver demanded wheel torque. The increased driver demanded wheel torque may comprise a driver demanded wheel torque that is greater than what can be achieved via the vehicle operating in creep mode (whether in the first, second, third or fourth mode of powertrain operation). In some examples, an accelerator pedal depression to greater than a predetermined threshold pedal position may be an indication of a tip-in event. The threshold may be a fraction of 100% depressed. For example, the threshold may be 10% depressed, 20% depressed, etc.

Responsive to a tip-in event from any one of the first mode, the second mode, the third mode or the fourth mode, method 500 begins at step 505 and includes determining the driver demanded wheel torque (Tq_whlReqDD) as a function of accelerator pedal position. With the driver demanded wheel torque determined at 505, method 500 proceeds to 520. At 520, method 500 includes indicating whether the powertrain is being operated in the EV mode. In other words, at 520, method 500 determines whether the powertrain is operating in the first mode where the electric machine/motor(s) are providing wheel torque with the engine off. If so, method 500 proceeds to 525. At 525, method 500 includes determining whether the driver demanded wheel torque is greater than an engine pull-up threshold. In other words, at 525, method 500 includes determining whether the driver demanded wheel torque is such that the engine has to be pulled up in order to meet the driver demanded wheel torque request, as the request cannot be satisfied by the electric machine/motor(s) alone.

If, at 525 it is indicated that driver demanded wheel torque is not greater than the engine pull-up threshold, then method 500 may proceed to 535. At 535, method 500 includes using the electric machine/motor(s) to meet the driver demanded wheel torque request. Again, the electric machine/motor(s) refer to electric machine/motor(s) positioned downstream of the transmission (e.g. electric machine 291 and electric motor(s) 133a and 133b at FIG. 2), as opposed to electric machine/motors positioned upstream of the transmission (e.g. ISG 240 and BISG 142 at FIG. 2). At 535, the motor torque request (Tq_mtrReq) may be determined by the following equation:

$$Tq\_mtrReq = Tq\_whlReqDD / rt\_mtr2whl; \quad (6)$$

where rt_mtr2whl is the torque ratio from the particular electric machine/motor to associated wheel as discussed above with regard to equation (2). In response to the motor torque request being determined at 535, method 500 may include controlling the appropriate electric machine/motor(s) to produce the requested motor torque for meeting the driver demanded wheel torque request. While operating in this manner, method 500 may continue to monitor driver demanded torque in the event that conditions change.

Returning to 525, in a situation where driver demanded wheel torque is greater than the engine pull up threshold, method 500 proceeds to 530. At 530, method 500 includes pulling up the engine to start combusting air and fuel. Torque may be distributed between the electric machine/motor(s) and engine according to a predetermined strategy. Briefly, the predetermined strategy may be intended to obtain optimal energy management to maximize overall powertrain efficiency via identifying a desired electric machine torque. The desired electric machine torque may be determined based on a number of factors, including but not limited to battery state of charge, driver demand power, engine speed, battery charge/discharge limits, electric machine minimum/maximum torques, etc., in conjunction with a combination of calibrations (e.g. lookup tables). Method 500 may then end.

Returning to 520, in response to a tip-in event and further responsive to an indication that the powertrain is not being operated in the first mode (EV mode), method 500 proceeds to 540. At 540, method 500 includes engaging the transmission if not already engaged. For example, if the powertrain was being operated in the second mode, then the transmission may be decoupled from the engine, and thus at 540 method 500 includes coupling the transmission to the engine. As one example, for powertrains that include the driveline disconnect clutch (e.g. driveline disconnect clutch 236 at FIG. 2), the driveline disconnect clutch may be commanded closed so as to couple the engine to the transmission. It may be understood that in such an example, a transmission gear may also be engaged or commanded engaged. In examples where the powertrain does not include a driveline disconnect clutch, a transmission gear may be engaged from a disengaged state. As an example, if the transmission is a dual-clutch transmission where a first clutch and a second clutch control odd and even gear sets, respectively, then one of the first clutch or the second clutch may be commanded closed (and a gear of the transmission engaged) as opposed to both clutches being open. In another example, one or more of the forward clutch (e.g. forward clutch 210 at FIG. 2), and/or gear clutches (e.g. gear clutches 211) may be controlled so as to couple the transmission to the engine with transmission gearing engaged. It may be understood that with the powertrain operating in other modes (e.g. third mode or the fourth mode), the transmission may already be engaged as discussed above.

With the transmission engaged and the engine coupled to the transmission at 540, method 500 proceeds to 545. At 545, method 500 includes determining an engine torque request. There may be a number of steps for determining the engine torque request which will be described below with regard to steps 550, 555, 560 and 565.

At step 550, method 500 includes defining a wheel torque contribution from a crankshaft path to the wheels as road load torque (Tq_roadLoad), which may be understood to be wheel torque required for providing nominal road load, where road load is related to force imparted on the vehicle while driving due to sources including but not limited to tire rolling resistance, aerodynamic drag, etc., with nominal vehicle mass. With the wheel torque contribution from the crankshaft path to the wheels defined as such, corresponding turbine torque may be determined based on the following equation:

$$Tq\_turbine = Tq\_roadLoad / (rt\_gb * rt\_fd); \quad (7)$$

where rt_gb is the torque ratio of the transmission gear box and rt_fd is the torque ratio of the final drive.

With the turbine torque determined, method 500 proceeds to 555. At 555, method 500 includes deriving turbine speed acceleration (d(Nt)/dt) from desired vehicle acceleration (dvspd/dt_des), or in other words, the desired change in vehicle speed over time. Desired vehicle acceleration may be determined as a function of driver demanded wheel torque Tq_whlReqDD and/or as a function of accelerator pedal position and vehicle speed. It may be understood that a condition for deriving turbine speed acceleration may include an indication that the transmission does not change gears. Turbine speed acceleration may thus be derived based on the following equation:

$$d(Nt)/dt = rt\_gb * rt\_fd * (dvspd/dt)\_des; \quad (8)$$

where rt_gb is the torque ratio of the transmission gear box and rt_fd is the torque ratio of the final drive, as discussed above.

With turbine speed acceleration determined at 555, method 500 proceeds to 560. At 560, method 500 includes deriving an impeller speed acceleration target (d(Nimp)/dt) from the turbine torque (Tq_turbine) determined at step 550 and the turbine speed acceleration (d(Nt)/dt) determined at 555. Specifically, the open torque converter model may be used to derive the impeller speed acceleration target based on the turbine torque and turbine speed acceleration.

Then with the impeller speed acceleration target determined, method 500 proceeds to 565. At 565, method 500 includes determining the engine torque request (Tq_engReq) using the information gleaned from steps 550-560. Specifically, the engine torque request is determined at 565 from the following equation:

$$Tq\_engReq = Tq\_turb/(rt\_conv) + Jeng \cdot (d(Nimp)dt); \quad (9)$$

where rt_conv is the torque ratio of the torque converter and Jeng is engine inertia.

With the engine torque request determined at 565 it may be understood that engine torque actuator(s) (e.g. torque actuators 204 at FIG. 2) may be commanded under control of the controller to control engine torque output in a manner to meet the engine torque request.

Proceeding to 570, method 500 includes determining the motor torque request (Tq_mtrReq) at the transmission output (e.g. electric machine 291 at FIG. 2) and/or front axle (e.g. electric motor(s) 133a and 133b at FIG. 2). Specifically, the motor torque request may be determined as a function of the difference between driver demanded wheel torque (Tq_whlReqDD) and the torque contribution from the crankshaft path (Tq_roadLoad) as per the following equation:

$$Tq\_mtrReq = (Tq\_whlReqDD - Tq\_roadLoad) / rt\_mtr2whl; \quad (10)$$

where rt_mtr2whl is the torque ratio from the particular electric machine/motor to associated wheel as discussed above with regard to equation (2). Responsive to determining the motor torque request, the appropriate electric machine/motor(s) may be controlled to meet the motor torque request similar to that discussed above.

Continuing to 575, method 500 includes determining whether impeller speed and turbine speed are within a predetermined speed threshold (e.g. within 5 RPM, 2 RPM, 1 RPM, etc.) of one another. If not, then method 500 returns to step 545 where the engine torque request continues to be determined and satisfied via engine operation, and where the motor torque request continues to be determined and satisfied via electric machine/motor operation. Said another way, at 575, current operational conditions may be maintained under circumstances where impeller speed and turbine speed are not close enough to one another to enable the torque converter lock-up clutch to be commanded closed.

Alternatively, if at 575 it is determined that impeller speed and turbine speed are within the predetermined speed threshold of one another, then method 500 may include commanding the torque converter locked via controlling the torque lock-up clutch fully closed at step 578. With the torque converter locked, method 500 proceeds to 580, where torque distribution between the engine and motor(s) relies on a predetermined strategy. Again, as mentioned above the predetermined strategy may be intended to obtain optimal energy management to maximize overall powertrain efficiency via identifying desired electric machine torque, based on factors including but not limited to battery SOC, driver demand power, engine speed, battery charge/discharge limits, electric machine minimum/maximum torques, etc., in conjunction with a combination of calibrations.

Thus, discussed herein a method may include prioritizing usage of an electric motor over an engine to propel a vehicle at a predetermined wheel creep torque, and responsive to an engine start request while the vehicle is propelled solely via the electric motor, coordinating an electric motor torque and an engine torque in a first mode, a second mode or a third mode based on whether the electric motor can continue to provide the predetermined wheel creep torque.

For such a method, the request to start the engine may pertain to usage of the engine for purposes other than propelling the vehicle for coordinating the electric motor torque and the engine torque in the first mode.

For such a method, the electric motor positioned downstream of the transmission may include an electric machine integrated into a rear differential unit of the vehicle.

For such a method, the electric motor positioned downstream of the transmission may include a first and a second electric motor that each drive a front axle or a rear axle of the vehicle.

For such a method, the first mode may include an indication that the electric motor can continue to provide an entirety of the predetermined wheel creep torque without assistance from the engine. Such a method may further include decoupling the engine from the transmission and controlling a speed of the engine to a second engine idle speed that is lower than a first engine idle speed, where the first engine idle speed corresponds to a desired engine idle speed for propelling the vehicle at the predetermined wheel creep torque in absence of any contribution from the electric motor.

For such a method, the second mode may include an indication that the request to start the engine is due to the electric motor not being able to continue providing any torque to propel the vehicle. The method may further include mechanically coupling the engine to the transmission and controlling the speed of the engine to the first engine idle speed.

For such a method, the third mode may include an indication that the electric motor can continue to provide at least a portion of the predetermined wheel creep torque. The method may further include obtaining a first impeller speed that is based on a difference between a maximum wheel torque that can be contributed via the electric motor and the predetermined wheel creep torque, and obtaining a second impeller speed corresponding to a minimum impeller speed. The method may further include controlling the engine to a third engine idle speed that is a maximum between the first impeller speed and the second impeller speed. In such an example, the method may further include commanding an engine wheel creep torque as a function of the third engine idle speed, and commanding an electric motor wheel creep torque as a function of a difference between the predetermined wheel creep torque and the engine wheel creep torque. The minimum impeller speed may be a function of operating conditions of the engine and transmission protection limits.

For such a method, the method may further comprise discontinuing the electric motor torque in response to an indication that the vehicle is stationary.

Another example of a method for a hybrid vehicle may include in response to an acceleration request received while the hybrid vehicle is operating in a creep mode where the vehicle is being propelled by at least an electric motor and while an engine is combusting air and fuel, the electric motor positioned downstream of a transmission and a torque converter that includes an impeller and a turbine, mechanically coupling or maintaining mechanically coupled the engine and the transmission, and providing the acceleration request via the electric motor and commanding an engine torque to prepare for an impeller speed inertia compensation and a road load until an impeller speed and a turbine speed are within a threshold speed of one another.

For such a method, the method may further include commanding the torque converter to be locked in response to the impeller speed and the turbine speed being within the threshold speed of one another.

For such a method, the method may further include determining the engine torque via the steps of: 1) defining a wheel torque contribution from a crankshaft path as a road load torque to obtain a corresponding turbine torque; 2) determine a desired vehicle acceleration based on a position of an accelerator pedal and a vehicle acceleration to determine a turbine speed acceleration as a function of the desired vehicle acceleration; 3) obtain an impeller speed acceleration target via an open torque converter model based on the corresponding turbine torque and the turbine speed acceleration; 4) determine the engine torque based on the turbine torque, an engine inertia, and the impeller speed acceleration target; and controlling the engine to produce the engine torque. In such an example, providing the acceleration request via the electric motor may further include determining a driver demanded wheel torque as a function of the acceleration request, determining an electric motor torque based on a difference between the driver demanded wheel torque and the road load torque, and controlling the electric motor to provide the electric motor torque.

Turning now to FIG. 6, it depicts a prophetic example timeline 600 for controlling the engine and electric motor(s) (e.g. electric machine 291 and electric motor(s) 133a, 133b at FIG. 2) during a creep mode of vehicle operation in response to an engine start request. Timeline 600 includes plot 605, indicating a speed of the vehicle, over time. Timeline 600 further includes plot 610, indicating torque from the electric machine (e.g. electric machine 291 at FIG. 2) and/or electric motor(s) (e.g. electric motors 133a and 133b at FIG. 2), over time. As mentioned above, the electric machine may be referred to as a P3 motor, and the electric motor(s) may be referred to as P4 motor(s). Timeline 600 further includes plot 615, indicating whether there is a request to start the engine (yes or no), where a request to start the engine refers to a request to start the engine combusting air and fuel. Timeline 600 further includes plot 620, indicating whether the transmission is engaged (E) or disengaged (D) from the engine, over time. Timeline 600 further includes plot 625, indicating engine speed, over time.

At time t0, it may be understood the vehicle is operating in creep mode, as vehicle speed (plot 605) is below a threshold vehicle speed (represented by dashed line 606). All of the wheel torque requested to propel the vehicle at the current creep speed is provided via the P3/P4 motor(s) (plot 610), as the engine is off (plot 615). With the engine off (plot 615) and the P3/P4 motor(s) providing the desired wheel torque for creep (plot 610), the transmission is disengaged from the engine (plot 620). As discussed above, in one example the transmission may be disconnected from the engine when the driveline disconnect clutch (e.g. driveline disconnect clutch 236 at FIG. 2) is commanded fully open. In other examples, a clutch or clutches (e.g. forward clutch 210 and/or gear clutches 211) may be commanded open to disengage the transmission from engine operation. In an example where the transmission includes a dual clutch transmission, each of its first and second clutches may be commanded fully open to decouple the transmission from the engine, for example. Furthermore, with the engine off, engine speed is 0 (RPM) (plot 625).

Between time t0 and t1, vehicle operating conditions do not substantially change and the vehicle is continued to be propelled via the P3/P4 motor(s) to provide vehicle creep. However, at time t1 an engine start is requested (plot 615). It may be understood that the engine start request at time t1 is not in response to a driver-initiated request for vehicle acceleration (e.g. tip-in event), but rather is due to another reason. In this example timeline 600 it may be understood that the reason for the engine start request is due to a request for cabin heating.

In response to the engine start request at time t1, the vehicle controller determines whether the P3/P4 motor(s) can continue to provide the torque requested for propelling the vehicle in creep mode. In this example timeline, while not explicitly illustrated, it may be understood that the controller determines at time t1 that the P3/P4 motor(s) can continue to provide the torque to propel the vehicle, without having to use the engine to provide additional wheel torque. Accordingly, the transmission is maintained disengaged from the engine (plot 620).

After time t1, the engine is controlled in idle speed control mode. Dashed line 630 depicts engine idle speed for creep mode under circumstances where the engine is used to provide the vehicle creep, in lieu of P3/P4 motor operation. Such an engine idle speed (referring to dashed line 630) may be used in conjunction with a torque converter to provide an expected (e.g. driver expected, or program desired) creep speed in a case where the vehicle does not include P3/P4 motor(s), or where the motors cannot provide requested torque (e.g. due to a fault or battery SOC reasons). In such a case, setting the engine idle speed to a value lower than that depicted by plot 630 may result in lower than driver expected (or program desired) creep speed. Thus, while it may be desirable to set engine idle speed as low as possible for fuel economy improvements, it may not be possible in some examples to lower engine idle speed because of the undesirable reduction in creep speed which may occur in response to lowering engine idle speed.

However, in this example timeline 600, with the transmission disengaged from the engine (plot 620), engine idle speed (plot 625) is controlled to a value lower than that depicted at representative plot 630. The actual value that the engine idle speed is controlled to under circumstances such as those depicted at timeline 600 where the transmission is disengaged from the engine and the P3/P4 motor(s) are providing the wheel creep torque, may be a function of one or more of a minimum engine speed requirement and a reason for which the engine was initially pulled up in the first place. For example, a higher demand for cabin heating may result in a slightly higher engine speed, whereas a less aggressive request for cabin heating may result in a slightly lower engine speed. As another example, a request for air-conditioning may correspond to an engine speed slightly different than that of a request for cabin heating. Other similar examples are within the scope of this disclosure. The ability to lower the engine idle speed under such circumstances provides an advantage in that creep torque may accurately be provided via the P3/P4 motor, while inefficient torque transfer from the torque converter/transmission may be avoided due to the transmission being disengaged from the engine.

Between time t1 and t2, vehicle speed slows. Vehicle speed may slow due to the driver depressing a brake pedal (e.g. brake pedal 150 at FIG. 1), for example, to request a reduced vehicle speed. At time t2, the vehicle comes to a stop (plot 605). In this example timeline 600, while the vehicle is stopped the engine continues to operate while disconnected from the transmission (plot 625), and the P3/P4 motors continue to provide the creep torque. Thus, it may be understood that in this example timeline the driver depression of the brake pedal is sufficient to overcome the wheel torque that is being provided via the P3/P4 motor(s), thus enabling the vehicle to remain stationary after time t2. However, in other examples it may be understood that with the vehicle stationary, the P3/P4 motor torque may be cancelled, which may further improve fuel economy by discontinuing motor torque requirements for creep during vehicle-stationary conditions.

Thus, the timeline of FIG. 6 depicts a situation where creep is being provided via the P3/P4 motor(s) at the time of an engine start request, where the engine start request is due to a reason other than an increase in wheel torque, where such a reason does not include a P3/P4 motor fault or that the battery is unable to continue supplying the P3/P4 motor(s) with energy. Responsive to an indication that the P3/P4 motor(s) can provide the wheel torque requested for creep, the engine may be disengaged from (or maintained disengaged from) the transmission, and operated under engine idle speed control in a manner that is dependent on the reason for the engine pull-up request and minimum engine speed considerations. By controlling engine speed as such, fuel economy may be improved due to engine idle speed being lower than that otherwise used for creep mode under conditions where the engine is engaged with the transmission.

Turning now to FIG. 7, it depicts another prophetic example timeline 700, depicting how the engine and electric machine/motor (e.g. P3/P4) operation may be coordinated to provide desired creep behavior under circumstances where an engine start is requested while the electric machine/motor(s) are providing the desired creep and where the electric machine/motor(s) are not able to provide all of the creep wheel torque, but only some fraction of the creep wheel torque. Timeline 700 includes plot 705, indicating vehicle speed, over time. The vehicle may be stopped (0) or may be traveling at a speed greater than stopped (+), over time. Timeline 700 further includes plot 710, indicating electric machine/motor torque (e.g. electric machine 291 or electric motor(s) 133a and 133b at FIG. 2), over time. As discussed above, herein the electric machine/motors are referred to as P3/P4 motors, respectively. The P3/P4 motor(s) may be producing no torque (0), or may produce a greater amount (+) of torque than no torque. Timeline 700 further includes plot 715, indicating whether an engine start is requested (yes or no), over time. Timeline 700 further includes plot 720, indicating whether the transmission is engaged (E) or disengaged (D) from the engine, over time. Timeline 700 further includes plot 725, indicating engine speed, over time. Engine speed may be at 0 RPM, or may be greater than (+) 0 RPM, over time.

At time t0, it may be understood that the vehicle is operating in creep mode, as vehicle speed (plot 705) is below a threshold vehicle speed (represented by dashed line 706).

At time t0, the creep torque request is being fulfilled by the P3/P4 motor(s) (plot 710). The engine is not combusting and is therefore not rotating (plot 725), and an engine start request has not yet been received (plot 715) at the controller. Furthermore, the transmission is disengaged from the engine at time t0.

Between time t0 and t1 operating conditions do not substantially change. However, at time t1 an engine start is requested (plot 715). It may be understood that in this example timeline 700, the engine start request is due to reasons other than an increased wheel torque. For illustrative purposes, the engine start request is due to a request for cabin heating or due to the motor or battery being unable to provide the full creep torque request in this particular timeline.

With the engine start request received at the controller at time t1, the capability of the P3/P4 motor(s) are checked via the controller to determine whether the P3/P4 motor(s) can continue to provide the creep torque request. In this example timeline, it may be understood that the controller determines at time t1 that the P3/P4 motor(s) cannot continue to provide the full creep torque requested. Accordingly, the engine and P3/P4 motor(s) are controlled as discussed above with regard to the method of FIG. 3. While all of the steps of method 400 are not depicted at timeline 700, the methodology will be briefly reiterated here. In response to the engine start request at time t1, the controller determines a maximum wheel torque that the P3/P4 motor can contribute towards fulfilling the creep torque request. The maximum wheel torque (Tq_whlMtrMax) that can be contributed by the P3/P4 motor is depicted by dashed line 711. Next, the corresponding wheel torque contribution from the impeller (Tq_whlImp) is determined by the difference of the creep wheel torque and the max wheel torque (Tq_whlMtrMax). After that, the corresponding impeller speed (Nimp_1) that can provide the turbine torque derived from the impeller (Tq_whlImp) and gear box ratio (rt_gb) and turbine speed (Nt_speed) is obtained. Meanwhile, a minimum impeller speed (Nimp_2) is determined (considering transmission protection and engine operating conditions, etc.), and the engine idle speed is selected based on a maximum between the impeller speed (Nimp_1) that can provide the turbine torque derived from the impeller (Tq_whlImp) and the minimum impeller speed (Nimp_2). Once the engine idle speed has been determined as discussed, the wheel creep torque that can be supplied from the engine operating at the determined engine idle speed is determined (refer to step 435 of method 400), and thereafter the motor request is obtained (refer to step 440 of method 400) to compensate the engine to deliver the full creep wheel torque.

In this example timeline 700, the corresponding impeller speed (Nimp_1) that can provide the turbine torque derived from the impeller, gear box ratio and turbine speed is represented by dashed line 727. However, the minimum impeller speed (Nimp_2), represented by dashed line 726, is greater than Nimp_1. Thus, in this example timeline, engine idle speed (plot 725) is controlled to a speed corresponding to the minimum impeller speed (Nimp_2) after time t1. While engine torque is not specifically illustrated in this example timeline, it may be understood that, as discussed above with regard to step 435 of method 400, that the wheel creep torque that can be supplied from the engine operating at the determined engine idle speed may be determined as a function of the engine idle speed, turbine speed and transmission gear box torque ratio.

Because the engine idle speed that the engine is ultimately controlled to (plot 725) corresponds to the minimum impeller speed (Nimp_2), this means that the engine torque that the engine produces at the engine idle speed corresponding to the minimum impeller speed (Nimp_2) is greater than otherwise could be if the maximum wheel torque of the P3/P4 motor(s) (Tq_whlMtrMax) were to be used. Because the P3/P4 motor torque request is determined from a difference between desired wheel creep torque and the creep torque contributed by the engine (refer to step 440 of method 400), and because the creep torque contributed by the engine is higher than what it could otherwise be due to the engine idle speed corresponding to the minimum impeller speed (Nimp_2), the P3/P4 motor torque requested (plot 710) is less than the maximum wheel torque (Tq_whlMtrMax) that could be contributed by the P3/P4 motor(s). In this example timeline, the motor torque request determined from the engine torque produced at the determined engine idle speed is represented by dashed line 712.

Close to time t2, vehicle speed begins to decline (plot 705), as the vehicle operator steps down on the brake pedal. At time t2, the vehicle stops. With the vehicle stopped at time t2, the P3/P4 motor torque is cancelled (plot 710), and the engine continues to operate at the engine idle speed corresponding to the minimum impeller speed (plot 725).

In this way, a controller may regulate a distribution between engine and motor torques for controlling a vehicle creep mode of operation in response to an engine start request while the vehicle is being propelled via the motor(s), and further in response to a tip-in event from a situation where both the engine and motor(s) are operating during the creep mode of operation.

The technical effect of controlling a distribution between engine and motor torques for controlling the vehicle creep mode in response to an engine start request while the vehicle is being propelled via the motor(s) is to enable an engine idle speed to be as low as possible for fuel economy improvements while the motor(s) provide a bulk of the creep torque request. The technical effect of controlling the distribution between engine and motor torques in response to a tip-in event from a situation where both the engine and motor(s) are operating during the creep mode of operation is to enable a situation where the vehicle acceleration request is provided via the motor(s) while engine torque is used just to prepare for an impeller speed inertia compensation (to balance the engine speed and torque converter operation) and road load before impeller speed and turbine speed are close enough to one another to lock the torque converter. This may enable the powertrain to operate at high efficiency by avoiding low efficiency of the torque converter before the torque converter is locked.

The systems discussed herein, along with the methods discussed herein, may enable one or more systems and one or more methods. In one example, a method comprises prioritizing usage of an electric motor over an engine to propel a vehicle at a predetermined wheel creep torque, and responsive to an engine start request while the vehicle is propelled solely via the electric motor, coordinating an electric motor torque and an engine torque in a first mode, a second mode or a third mode based on whether the electric motor can continue to provide the predetermined wheel creep torque. In a first example of the method, the method further includes wherein the request to start the engine pertains to usage of the engine for purposes other than propelling the vehicle for coordinating the electric motor torque and the engine torque in the first mode. A second example of the method optionally includes the first example, and further includes wherein the electric motor positioned downstream of the transmission includes an electric machine integrated into a rear differential unit of the vehicle. A third example of the method optionally includes any one or more or each of the first through second examples, and further includes wherein the electric motor positioned downstream of the transmission includes a first and a second electric motor that each drive a front axle or a rear axle of the vehicle. A fourth example of the method optionally includes any one or more or each of the first through third examples, and further includes wherein the first mode includes an indication that the electric motor can continue to provide an entirety of the predetermined wheel creep torque without assistance from the engine, and further comprising: decoupling the engine from the transmission and controlling a speed of the engine to a second engine idle speed that is lower than a first engine idle speed, where the first engine idle speed corresponds to a desired engine idle speed for propelling the vehicle at the predetermined wheel creep torque in absence of any contribution from the electric motor. A fifth example of the method optionally includes any one or more or each of the first through fourth examples, and further includes wherein the second mode includes an indication that the request to start the engine is due to the electric motor not being able to continue providing any torque to propel the vehicle and further comprising: mechanically coupling the engine to the transmission and controlling the speed of the engine to the first engine idle speed. A sixth example of the method optionally includes any one or more or each of the first through fifth examples, and further includes wherein the third mode includes an indication that the electric motor can continue to provide at least a portion of the predetermined wheel creep torque, and further comprising: obtaining a first impeller speed that is based on a difference between a maximum wheel torque that can be contributed via the electric motor and the predetermined wheel creep torque, and obtaining a second impeller speed corresponding to a minimum impeller speed; and controlling the engine to a third engine idle speed that is a maximum between the first impeller speed and the second impeller speed. A seventh example of the method optionally includes any one or more or each of the first through sixth examples, and further comprises commanding an engine wheel creep torque as a function of the third engine idle speed; and commanding an electric motor wheel creep torque as a function of a difference between the predetermined wheel creep torque and the engine wheel creep torque. An eighth example of the method optionally includes any one or more or each of the first through seventh examples, and further includes wherein the minimum impeller speed is a function of operating conditions of the engine and transmission protection limits. A ninth example of the method optionally includes any one or more or each of the first through eighth examples, and further comprises discontinuing the electric motor torque in response to an indication that the vehicle is stationary.

Another example of a method for a hybrid vehicle comprises in response to an acceleration request received while the hybrid vehicle is operating in a creep mode where the vehicle is being propelled by at least an electric motor and while an engine is combusting air and fuel, the electric motor is positioned downstream of a transmission and a torque converter that includes an impeller and a turbine, mechanically coupling or maintaining mechanically coupled the engine and the transmission; and providing the acceleration request via the electric motor and commanding an engine torque to prepare for an impeller speed inertia compensation and a road load until an impeller speed and a turbine speed are within a threshold speed of one another. In a first example of the method, the method further comprises commanding the torque converter to be locked in response to the impeller speed and the turbine speed being within the threshold speed of one another. A second example of the method optionally includes the first example, and further comprises determining the engine torque via the steps of: 1) defining a wheel torque contribution from a crankshaft path as a road load torque to obtain a corresponding turbine torque; 2) determine a desired vehicle acceleration based on a position of an accelerator pedal and a vehicle acceleration to determine a turbine speed acceleration as a function of the desired vehicle acceleration; 3) obtain an impeller speed acceleration target via an open torque converter model based on the corresponding turbine torque and the turbine speed acceleration; 4) determine the engine torque based on the turbine torque, an engine inertia, and the impeller speed acceleration target; and controlling the engine to produce the engine torque. A third example of the method optionally includes any one or more or each of the first through second examples, and further includes wherein providing the acceleration request via the electric motor further comprises determining a driver demanded wheel torque as a function of the acceleration request; determining an electric motor torque based on a difference between the driver demanded wheel torque and the road load torque; and controlling the electric motor to provide the electric motor torque.

An example of a system for a hybrid vehicle comprises an engine, a torque converter and a transmission; an electric motor positioned downstream of the transmission; and a controller with computer readable instructions stored on non-transitory memory that when executed, cause the controller to: control the electric motor to produce an electric motor torque corresponding to a desired wheel creep torque; and in response to a request to start the engine, mechanically couple the engine and the transmission and coordinate the electric motor torque and an engine torque to propel the vehicle based on the desired wheel creep torque. In a first example of the system, the system may further include wherein the controller stores further instructions to: determine an engine idle speed as a function of a maximum value between a first impeller speed and a second impeller speed, where the first impeller speed is obtained based on a wheel torque contribution from an impeller of the torque converter, and where the second impeller speed is a function of one or more of engine operating conditions and transmission protection limits; and control the engine to the engine idle speed. A second example of the system optionally includes the first example, and further includes wherein the controller stores further instructions to determine the wheel torque contribution from the impeller as a difference between the desired wheel creep torque and a maximum wheel torque that can be contributed via the electric motor. A third example of the system optionally includes any one or more or each of the first through second examples, and further includes wherein the controller stores further instructions to determine the engine torque from the engine idle speed; and command the engine to produce the engine torque. A fourth example of the system optionally includes any one or more or each of the first through third examples, and further includes wherein the controller stores further instructions to determine the electric motor torque based on a difference between the engine torque and the desired wheel creep torque. A fifth example of the system optionally includes any one or more or each of the first through fourth examples, and further comprises an indication that the electric motor can continue to provide some, but not all, of the electric motor torque corresponding to the desired wheel creep torque responsive to the request to start the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
with instructions stored in a control system of a vehicle, the control system controlling an electric motor and an engine in a powertrain of the vehicle for propelling the vehicle, prioritizing usage of the electric motor over the engine to propel the vehicle at a predetermined wheel creep torque, including propelling the vehicle at the predetermined wheel creep torque solely with the motor, and responsive to an engine start request while the vehicle is propelled solely via the electric motor, coordinating an electric motor torque and an engine torque in a first mode, a second mode or a third mode based on whether the electric motor can continue to provide the predetermined wheel creep torque, wherein the first mode includes in response to a determination by the control system that the electric motor can continue to provide an entirety of the predetermined wheel creep torque without assistance from the engine, continuing operation with the engine decoupled from the transmission and controlling a speed of the engine to a second engine idle speed that is lower than a first engine idle speed, where the first engine idle speed corresponds to a desired engine idle speed for propelling the vehicle at the predetermined wheel creep torque in absence of any contribution from the electric motor.

2. The method of claim 1, wherein the engine start request pertains to usage of the engine for purposes other than propelling the vehicle for coordinating the electric motor torque and the engine torque in the first mode.

3. The method of claim 1, wherein the electric motor, which is positioned downstream of the transmission, includes an electric machine integrated into a rear differential unit of the vehicle.

4. The method of claim 1, wherein the electric motor, which is positioned downstream of the transmission, includes a first and a second electric motor that each drive a front axle or a rear axle of the vehicle.

5. The method of claim 1, wherein the second mode includes in response to a determination by the control system that the request to start the engine is due to the electric motor not being able to continue providing any torque to propel the vehicle:
mechanically coupling the engine to the transmission and controlling the speed of the engine to the first engine idle speed.

6. The method of claim 1, further comprising:
discontinuing the electric motor torque in response to a determination by the control system that the vehicle is stationary.

7. A method comprising:
with instructions stored in a control system of a vehicle, the control system controlling an electric motor and an engine in a powertrain of the vehicle for propelling the vehicle, prioritizing usage of the electric motor over the engine to propel the vehicle at a predetermined wheel creep torque, including propelling the vehicle at the predetermined wheel creep torque solely with the motor, and responsive to an engine start request while the vehicle is propelled solely via the electric motor, coordinating an electric motor torque and an engine torque in a first mode, a second mode or a third mode based on whether the electric motor can continue to provide the predetermined wheel creep torque, wherein the third mode includes in response to a determination by the control system that the electric motor can continue to provide at least a portion of the predetermined wheel creep torque:
obtaining a first impeller speed that is based on a difference between a maximum wheel torque that can be contributed via the electric motor and the predetermined wheel creep torque, and obtaining a second impeller speed corresponding to a minimum impeller speed; and
controlling the engine to a third engine idle speed that is a maximum between the first impeller speed and the second impeller speed.

8. The method of claim 7, further comprising:
controlling an engine wheel creep torque as a function of the third engine idle speed; and
controlling an electric motor wheel creep torque as a function of a difference between the predetermined wheel creep torque and the engine wheel creep torque.

9. The method of claim 7, wherein the minimum impeller speed is a function of operating conditions of the engine and transmission protection limits.

* * * * *